(12) United States Patent
Baier et al.

(10) Patent No.: US 8,965,567 B2
(45) Date of Patent: Feb. 24, 2015

(54) SYSTEM FOR DECENTRALIZED MATERIAL FLOW CONTROL

(75) Inventors: Georg Baier, München (DE); Konstantin Keutner, Neubiberg (DE)

(73) Assignee: Siemens Aktiengesellschaft, Munich (DE)

(*) Notice: Subject to any disclaimer, the term of this patent is extended or adjusted under 35 U.S.C. 154(b) by 688 days.

(21) Appl. No.: 13/263,197

(22) PCT Filed: Mar. 23, 2010

(86) PCT No.: PCT/EP2010/053767
§ 371 (c)(1),
(2), (4) Date: Oct. 6, 2011

(87) PCT Pub. No.: WO2010/115704
PCT Pub. Date: Oct. 14, 2010

(65) Prior Publication Data
US 2012/0024666 A1  Feb. 2, 2012

(30) Foreign Application Priority Data

Apr. 6, 2009 (DE) .......... 10 2009 016 578
Jun. 30, 2009 (DE) .......... 10 2009 031 137

(51) Int. Cl.
*G06F 7/00* (2006.01)
*G05B 19/418* (2006.01)
*B64F 1/36* (2006.01)

(52) U.S. Cl.
CPC .......... *G05B 19/4189* (2013.01); *B64F 1/366* (2013.01); *G05B 2219/31003* (2013.01); *G05B 2219/32243* (2013.01); *G05B 2219/32345* (2013.01);
(Continued)

(58) Field of Classification Search
USPC .......... 700/230
See application file for complete search history.

(56) References Cited

U.S. PATENT DOCUMENTS

| | | | |
|---|---|---|---|
| 5,625,559 A | 4/1997 | Egawa .......... | 364/436 |
| 6,041,171 A | 3/2000 | Blaisdell et al. .......... | 703/6 |

(Continued)

FOREIGN PATENT DOCUMENTS

| | | | | |
|---|---|---|---|---|
| CN | 1218240 A | 6/1999 | .......... | B65G 47/51 |
| DE | 102005027687 A1 | 12/2006 | .......... | B64F 1/32 |

(Continued)

OTHER PUBLICATIONS

Chinese Office Action, Application No. 201080014526.5, 10 pages, Jun. 24, 2013.

(Continued)

*Primary Examiner* — Ramya Burgess
(74) *Attorney, Agent, or Firm* — King & Spalding L.L.P.

(57) ABSTRACT

A component of a material flow system for transporting goods has a mechatronics arrangement with transport elements, sensors and actuators for transporting the goods, a control device for controlling the mechatronics arrangement, interfaces to adjacent components and the surroundings, and an internal simulator for determining the future state of the component. The internal simulator co-operates with internal simulators of other components of the material flow system, for determining a prognosis of the future state of the installation of the material flow system. The decentralized internal simulators can be synchronously or asynchronously activated.

18 Claims, 6 Drawing Sheets

(52) U.S. Cl.
CPC ............. *G05B2219/32363* (2013.01); *G05B 2219/33273* (2013.01); *G05B 2219/45051* (2013.01)
USPC ....................................................... 700/230

(56) References Cited

U.S. PATENT DOCUMENTS

| | | | |
|---|---|---|---|
| 2002/0010527 A1 | 1/2002 | Wielebski et al. | ............ 700/230 |
| 2007/0078531 A1 | 4/2007 | Adra | ............... 700/31 |

FOREIGN PATENT DOCUMENTS

| | | | |
|---|---|---|---|
| DE | 102007054331 A1 | 5/2009 | ............ B65G 43/10 |
| EP | 1316504 A1 | 10/2002 | ................ B64F 1/32 |
| EP | 1510479 A1 | 7/2004 | ............ B65G 47/50 |
| WO | 2006/134007 A2 | 12/2006 | |

OTHER PUBLICATIONS

Fay, A. et al., "Dezentrale Automatisierungsstrategien fur Gepackbeforderungssysteme", Automatisierungstechnik 52, pp. 335-341, Jul. 2004.
Follert, G. et al., "Simulation Einer Agentengesteuerten Gepackforderanlage", Progress in Material Handling Research, pp. 160-184, 2008.
Fujii, S. et al., "Distributed Simulation Model for Computer Integrated Manufacturing", Proceedings of the Winter Simulation Conference, pp. 946-953, Dec. 11, 1994.
Gunthner, W., "Intelligent verteltt—Materialflusssteuerung im Internet der Dinge", 13 pages, Jan. 2008.
Hallenborg, K., Decentralized Scheduling of Baggage Handling Using Multi-Agent Technologies, Multiprocessor Scheduling, Theory and Applications, pp. 381-404, Dec. 2007.
International PCT Search Report and Written Opinion, PCT/EP2010/053013, 16 pages, Aug. 31, 2010.
International PCT Search Report and Written Opinion, PCT/EP2010/053767, 14 pages, Aug. 9, 2010.

SYSTEM FOR DECENTRALIZED MATERIAL FLOW CONTROL

CROSS-REFERENCE TO RELATED APPLICATIONS

This application is a U.S. National Stage Application of International Application No. PCT/EP2010/053767 filed Mar. 23, 2010, which designates the United States of America, and claims priority to German Application No. 10 2009 016 578.9 filed Apr. 6, 2009 and German Application No. 10 2009 031 137.8 filed Jun. 30, 2009. The contents of which are hereby incorporated by reference in their entirety.

TECHNICAL FIELD

The invention relates to a material flow system for transporting goods, comprising components for carrying out a transportation task. The invention further relates to a component of a material flow system for transporting goods.

BACKGROUND

Material flow systems should, as far as possible, reach their optimum throughput of the goods to be transported. For this purpose, material flow decisions such as the settings of points or whether new transported goods are to be loaded must be made such that unbalanced loads and jams do not arise. For this purpose, the current load state of the installation and, if present, information on the transported goods planned to be loaded can be used for a prediction of regions of the installation where jams, etc., can be expected. These can then be counteracted with suitable control strategies.

In systems with a central material flow computer (MFC), the computer administers the current loading state centrally and can therefore also calculate a prediction of future states centrally. Given the presence of a plan concerning existing transported goods to be loaded, said plan can also be taken into account for the calculation. Conventional central material flow systems have a central device, the material flow computer, which periodically receives all the necessary information as set out above from the subordinate control devices and can thus predict the future loading. The US patent application US2007/0078531A1 discloses a system and a method for dynamic simulation of process flows, wherein a central "simulation engine" is used. Central material flow computers (MFC) represent a bottleneck which can influence the performance and throughput of the material flow system. Should the central material flow computer fail, the whole material flow system can no longer adapt to changed loading conditions.

In the literature, proposals exist for decentralized material flow systems. Decentralized material flow systems can introduce a central device as an information hub (e.g. passively with an electronic blackboard or actively, similarly to a conventional MFC). But this means that the advantages of a centralized concept (no central bottleneck for performance, no single point of failure, common borders between mechatronics and control system) are lost again. A. Fay and I. Fischer propose in their article "Dezentrale Automatisierungsstrategien für Gepäckfördersysteme" [Decentralized automation strategies for luggage conveying systems] in Automatisierungstechnik 52 (2004) 7, published by Oldenbourg Verlag, for material flow systems to use internet routing mechanisms. However, the proposed decentralized concepts are inflexible and not efficient. For example, no updating is carried out in the case of route changes.

In "Evaluation of Routing Strategies for Decentralized Self-Organization in Large Scale Convey Systems. Progress in Material Handling Research: 2008; Material Handling Institute, 160-184, 2008", G. Follert and M. Roidl propose a concept without a central element. This is achieved by flooding the system with messages. The communication load produced is very large, since for each transport unit that is loaded, determination of the route is performed by flooding the communication network of the installation.

SUMMARY

According to various embodiments, a component for a material flow system can be provided which enables a more reliable prediction of the future development of the loading condition of the material flow system, wherein the component reacts flexibly and rapidly to changes in the material flow system without the need for a central device, such as a material flow computer.

According to an embodiment, in a material flow system for transporting goods, comprising components for carrying out a transportation task, a component may comprise: a) a mechanical element for transporting the goods; b) a sensory system for detecting states of the mechanical element and/or of the transported goods and/or of the surroundings; c) an actuator system for mechanically influencing the mechanical element and/or the transported goods; d) a control component for controlling the mechanical element and the actuator system, based on the data supplied by the sensory system, to current installation state data of the material flow system and to control parameters of the control component; e) interfaces with adjacent components and with the surroundings, and f) an internal simulator for determining a future state of the particular component, wherein from the respective future states of the particular component, a prediction of the future state of the installation of the material flow system can be determined.

According to a further embodiment, the internal simulator may determine a prediction of the future state of a particular component based on the current installation state data of the material flow system and the control parameters of the control component by simulation. According to a further embodiment, the internal simulator can access data from adjacent components via the interfaces and uses these data for simulation. According to a further embodiment, the material flow system may further comprise: a control optimizer which, based on the future state data for a particular component as predicted by the internal simulator, optimizes the control parameters accordingly. According to a further embodiment, the internal simulators can be activated cyclically and synchronously for all the components. According to a further embodiment, the internal simulators can be activated asynchronously. According to a further embodiment, unbalanced loads and jams can be recognized in the material flow system, by means of the internal simulators. According to a further embodiment, unbalanced loads and jams in the material flow system can be prevented by means of the control optimizer. According to a further embodiment, the internal simulator may have access to a loading plan of the material flow system.

According to another embodiment, a component of a material flow system for transporting goods, may comprise: a) a mechatronics system with transport elements, sensors and actuators for the transport of the goods; b) a control device for controlling the mechatronics, c) interfaces with adjacent components and with the surroundings, d) an internal simulator for determining the future state of the particular component, wherein the internal simulator cooperates with internal simulators of other components of the material flow system, in order to determine the future installation state of the material flow system.

According to a further embodiment, the component may further comprise: a control optimizer which, based on the future state data for the particular component as predicted by the internal simulator, adapts the control parameters of the control device accordingly. According to a further embodiment of the component, the control optimizer may prevent unbalanced loads or jams in the material flow system. According to a further embodiment of the component, the internal simulator may have access to installation state data of the material flow system. According to a further embodiment of the component, the component may make the presence thereof known to the adjacent components via the interfaces and automatically configures the internal simulator and the control optimizer according to the number and type of adjacent components.

BRIEF DESCRIPTION OF THE DRAWINGS

An exemplary embodiment will now be described in detail, making reference to the drawings, in which.

DETAILED DESCRIPTION

According to various embodiments, in a material flow system, in particular for transporting goods, comprising components for carrying out a transport assignment, a component comprises:
a) a mechanical element for transporting the goods;
b) a sensory system for detecting states of the mechanical element and/or of the transported goods and/or of the surroundings;
c) an actuator system for mechanically influencing the mechanical element and/or the transported goods;
d) a control component for controlling the mechanical element and the actuator system, based on the data supplied by the sensory system, to current installation state data of the material flow system and to control parameters of the control component;
e) interfaces with adjacent components and with the surroundings; and
f) an internal simulator for determining a future state of the particular component, wherein from the respective future states of the particular component, a prediction of the future state of the installation of the material flow system can be determined.

Decentralized material flow systems do not have a central material flow computer (MFC), but rather are assembled from cooperating autonomous components and modules which comprise both the mechatronics and the associated control device and are able to configure themselves largely automatically. Modules of such a system are, for example, conveyor belts, points or junctions. In conventional decentralized material flow systems, none of the module control devices has an overview of the whole material flow system and predictions about the future development of the loading state of the whole system cannot be made without further effort. The method according to various embodiments, however, enables the modules, that is, the components, together to carry out a distributed prediction on the future development of the loading state of the overall installation in that each module performs a simulation of future module states of said module with a dedicated (i.e. assigned to each component) internal simulator. A decentralized simulation component is integrated into each component of the material flow system. The complete information is available within each component (module) in order to simulate the future loading of said component, since the current loading and the internal behavior are already known. Furthermore, information concerning transport units to be transported in future must additionally be passed on by the advance modules and, similarly, passed on to the subsequent components. The precise form of modules in decentralized material flow systems is a design decision and is not part the subject matter of this method. For the method, it is only relevant that a module (component) is an entity that is considered, within a decentralized system, to be a self-contained unit and to possess information concerning the behavior thereof. The reliability of the system is increased in that no central material flow computer is present. If a decentralized control component fails, this does not result in a total system failure, since the tasks performed by the failed control component can be taken over by an adjacent component.

A first embodiment lies therein that the internal simulator determines a prediction of the future state of a particular component based on the current installation state data of the material flow system and the control parameters of the control component by simulation. The complete information is therefore available within each component in order to simulate future loading of said component, since the current installation loading and the internal behavior are known.

A further embodiment lies therein that the internal simulator can access data from adjacent components via the interfaces and uses these data for simulation. Information on future transport units to be transported can thus be determined by the advance modules and, similarly, passed on to subsequent components. This increases the effectiveness and precision of the prediction obtained by the simulation (loading, jams to be expected or unbalanced loads in the system).

A further embodiment lies in a control optimizer which, based on the future state data for particular component as predicted by the internal simulator, optimizes the control parameters accordingly. The control optimizer adapts the control parameters based on the predicted future installation states. In this way, control parameters are automatically derived from the results of the prediction.

A further embodiment lies therein that the internal simulators are activated cyclically and synchronously for all the components. The simulation of the components can be initiated cyclically and synchronously for all the components simultaneously. A cycle of this type can be initiated according to a fixed time pattern, for example, every 30 s, on the minute and the half-minute. Using a suitable protocol, it must be ensured that all the components synchronize at the same time and that the same time plan is used for the cycle start times. An example of such a protocol is the internet protocol ntp. At the start of the cycle, all the internal simulators are initialized with the transport units currently found in the component at the current locations of said units. Once the internal simulation is concluded, the data of the newly determined information base in the installation are communicated and a cycle is concluded. A plurality of cycles can be brought together before the newly arising information base is transferred to the control optimizer of the components.

A further embodiment lies therein that the internal simulators are activated asynchronously. The internal simulators of the components can also be activated asynchronously. As a result, the method is usable flexibly, depending on the application and the material flow system.

A further embodiment lies therein that unbalanced loads and jams are recognized in the material flow system by means of the internal simulators. Thus, an optimum throughput can be achieved in the material flow system for the goods to be transported. Material flow decisions, such as the settings of points, or whether new transported goods are to be loaded, can be taken so that no unbalanced loads or jams arise.

A further embodiment lies therein that unbalanced loads and jams in the material flow system are prevented by means of the control optimizer. As a result, material flow decisions, for example, the settings of points or whether new transported goods to be loaded, are made automatically and specifically, in order to prevent unbalanced loads and jams.

A further embodiment lies therein that the internal simulator has access to a loading plan of the material flow system. Thus, for each loading plan, a prediction can be drawn up matched to the currently existing installation capacity utilization and installation configuration.

According to another embodiment, a component of a material flow system, may comprise:
a) a mechatronics system with transport elements, sensors and actuators for the transport of the goods;
b) a control device for controlling the mechatronics,
c) interfaces with adjacent components and with the surroundings,
d) an internal simulator for determining the future state of the particular component, wherein the internal simulator cooperates with internal simulators of other components of the material flow system, in order to determine the future installation state of the material flow system. A component or module comprises the mechatronics of the transport technology, the sensory system and communications interfaces with the adjacent modules. Examples of modules are conveyor belts, points or junctions. Components/modules within the meaning of the invention can also be more complex than the above-mentioned examples. E.g. a junction including the incoming conveyor belts can be grouped together into a module. The precise form of modules in decentralized material flow systems is a design decision depending on, for example, infrastructural or application-specific preconditions (requirements). For the method, it is only relevant that a module is an entity that is regarded as a complete unit in the decentralized system and possesses information concerning the behavior of said module. A decentralized simulation component is integrated into each component/module of the material flow system. Within each module, the complete information is available in order to simulate the future internal loading thereof, since the current loading and the internal behavior are known. Furthermore, information concerning transport units to be transported in future must also be communicated by the advance modules and, similarly, passed on to subsequent modules. On failure of a decentralized simulation component, a total failure does not follow, since the tasks of the failed simulation components can be taken over by an adjacent component.

A further embodiment lies therein that the component comprises a control optimizer which, based on the future state data for the particular component as predicted by the internal simulator, adapts the control parameters of the control device accordingly. In this way, material flow decisions made automatically within the context of a control loop, such as the settings of points or whether new transported goods will be loaded, can be made automatically and specifically in order to achieve optimum loading states.

A further embodiment lies therein that the control optimizer prevents unbalanced loads or jams in the material flow system. Thus, an optimum throughput can be achieved in the material flow system for the goods being transported.

A further embodiment lies therein that the internal simulator of a component has access to installation state data of the material flow system and/or loading plan data. Thus, for each loading plan, a prediction can be drawn up matched to the currently existing installation capacity utilization and the installation configuration.

A further embodiment lies therein that the component makes the presence thereof known to the adjacent components via the interfaces and automatically configures the internal simulator and the control optimizer according to the number and type of adjacent components. This enables self-configuration of the decentralized control system. No loading scenarios are required for the setting (e.g. in the context of a knowledge database in which is stored what procedure should be followed in the respective loading scenarios).

Figure 1:
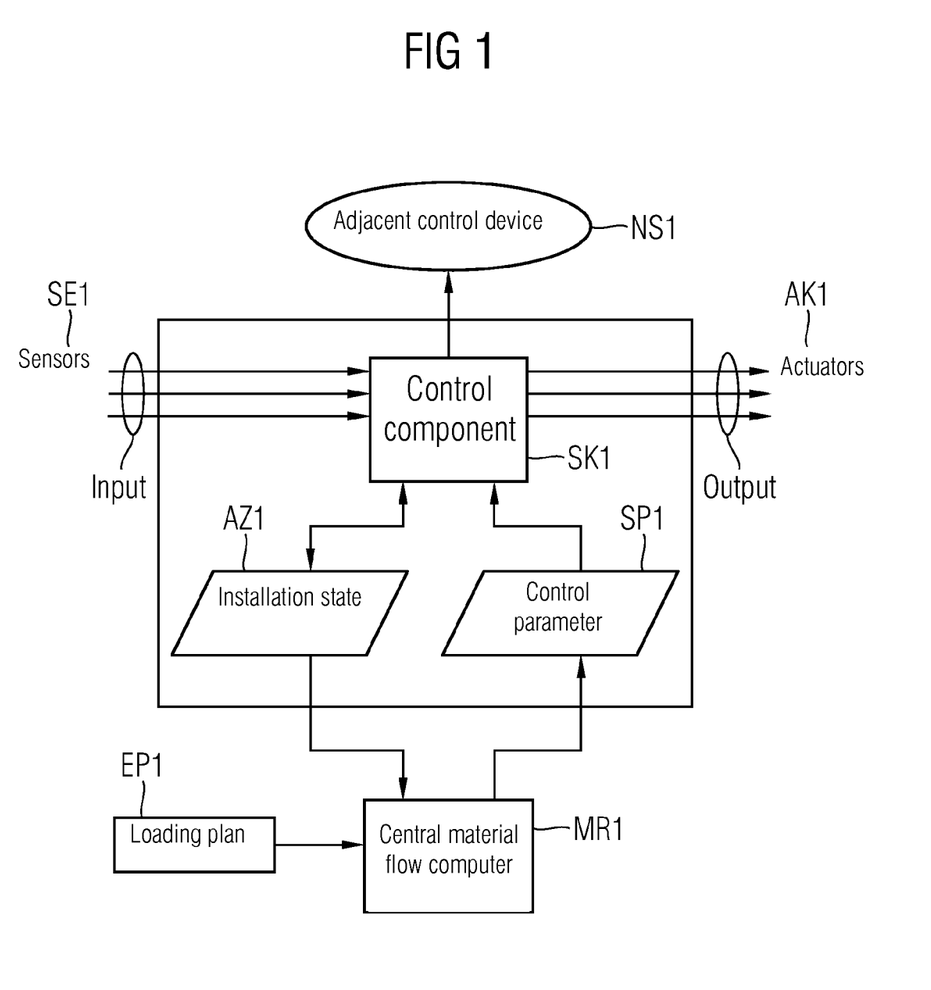
FIG. 1 is an illustration of the architecture for the use of a conventional central control computer.

FIG. 1 shows an architecture for the use of a conventional central material flow computer MR1 for the control of a material flow system (e.g. a transport system for the conveying and delivery of goods). The central material flow computer MR1 is usually utilized as a control computer and as an administration computer (e.g. for a central data storage system, for central loading planning or for simulation, for determining installation states that are to be expected). The central material flow computer MR1 communicates with control components SK1 (e.g. a memory-programmable control device) of the installation, for example, via cable or wireless (WLAN, Bluetooth) connections. A control component SK1 can also be connected to one or more adjacent control devices NS1 and can exchange data therewith or pass on control commands from the central material flow computer MR1. A control component SK1 also receives input via sensors SE1 (sensors in the domain of transport systems are e.g. optoelectric barriers or motion detectors) and, depending on the installation condition AZ1 and the control parameters SP1, influences actuators AKZ (e.g. servo components). The central material flow computer MR1 has access to the installation state data AZ1 of the installation components and controls a control component SK1 of the installation via said access and by influencing the control parameters SP1 thereof, depending on a loading plan EP1 that has been made available. The communication infrastructure is illustrated in FIG. 1 with arrows.

A disadvantage of the use of a central material flow computer MR1 for controlling a material flow system lies therein that all the central control and administration functions (e.g. carrying out installation simulations, data administration, communication with a control console) are bundled in the central material flow computer MR1. If the central material flow computer MR1 fails, the installation can no longer adapt to changing load situations and, in the most unfavorable case, the whole installation comes to a standstill. In order to ensure a high degree of failure security, an additional computer must be available as a "standby". This entails additional costs and is also often unable to prevent a certain amount of down time since, in the event of a system failure, the installation components must first be initialized and the standby computer (reserve computer) requires a run-up time in order to bring the installation back into operation.

Figure 2:
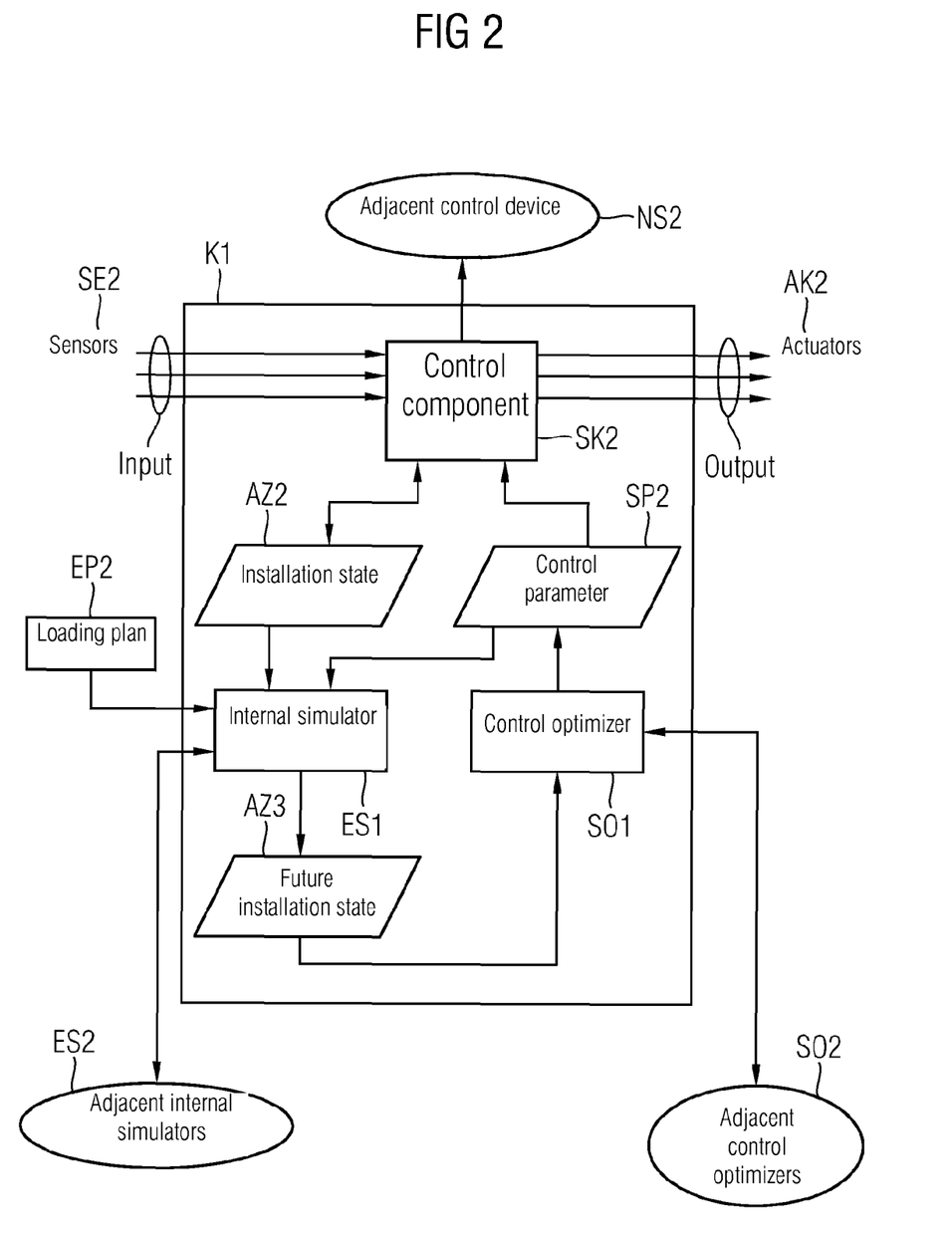
FIG. 2 is an exemplary architecture for the use of decentralized control components employing internal simulators.

FIG. 2 shows an exemplary architecture for the use of decentralized control components SK2 using internal simulators ES1 for the control and for installation simulation (for predicting loading states and forecasting jams, bottlenecks and unbalanced loads). As distinct from the architecture of a conventional control computer (MR1, FIG. 1), the architecture of FIG. 2 has an internal simulator component ES1 which has access to the installation state AZ2 and the control parameters SP2 of the module (component). Furthermore, the internal simulator ES1 can exchange data with the corresponding components of the adjacent module ES2 by means of a communication infrastructure. The communication infrastructure for controlling a material flow system can be realized wired (e.g. LAN, Ethernet, bus connections), wirelessly (e.g. WAN, radio link, Bluetooth) or in a mixed form between wired and wireless. The communication infrastructure is illustrated in FIG. 2 with arrows. The component (module) K1 shown in FIG. 2 for use in a material flow system comprises a decentralized control component SK2 which is connected to adjacent control devices NS2 and receives input from the physical infrastructure (points, conveyor belts, transport containers, etc.) via sensors SE2 (e.g. optoelectric barriers for notifying the arrival of transported goods). The control component SK2 can be configured, for example, as a memory programmable control device (SPS) which supplies an output for actuators AK2 (e.g. servo components, drives) depending on the installation state AZ2, the control parameter SP2 and the input from the sensors SE2.

The internal simulator ES1 determines the future installation state AZ3 (or the installation states at different time points in the future) from the data of the adjacent simulators ES2, from the loading plan EP2 and from the current installation state AZ2 by simulation. A component control optimizer SO1 automatically suitably adjusts the control parameters SP2, based on the predicted future installation states. The control optimizer SO1 can be connected to an adjacent control optimizer SO2 of an adjacent component (adjacent module) and request and/or directly influence control parameters from the adjacent component (adjacent module). In this way, a further optimization and efficiency is achieved in the installation operation.

The information basis for internal simulation therefore consists of two parts: firstly, the necessary data for the internal simulation and secondly, the data which are generated for controlling the material flow system. With regard to the necessary communication between the modules of the installation, the largest possible intersection of both data types is to be achieved. In general, the information base can be described as the function $$\mathcal{A}(m,t) := \mathcal{A}_e(m,t) \cup \mathcal{A}_s(m,t)$$

which depends on the module m and the time t. $T_e(\bullet,\bullet)$ is the portion of the information base for the internal simulation and $T_s(\bullet,\bullet)$ is the portion for the control device.

Figure 3:
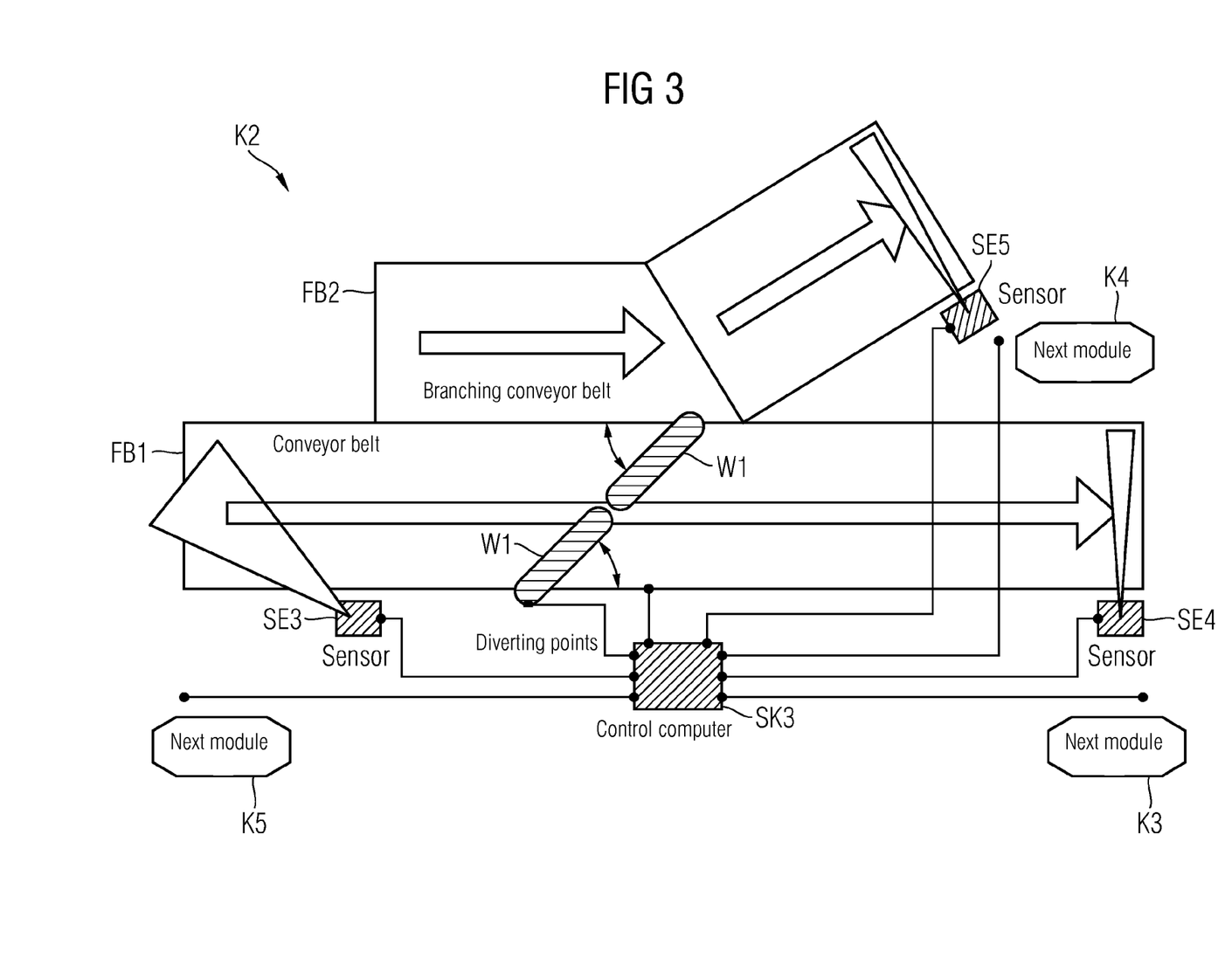
FIG. 3 is a schematic illustration of the structure of a component according to various embodiments using the example of a set of points.

FIG. 3 shows schematically the structure of a component K2 according to various embodiments using the example of a set of points. A component (module) K2-K5 comprises the mechanism of the conveying technology FB1, FB2, the mechanism for diverting W1, the sensors SE3, SE4 (e.g. optoelectric barriers, detectors) and actuators (e.g. drives, servo components) of the control device SK3 and communication interfaces with the adjacent modules K3-K5. Examples of modules are conveyor belts, points or junctions. Modules/components within the meaning of the invention can also be more complex than the examples previously given. For example, a junction can be grouped together with the incoming conveyor belts into one module. The module formation is based on decisions in systems engineering and can be performed by the technologist or plant engineer.

Figure 4A:
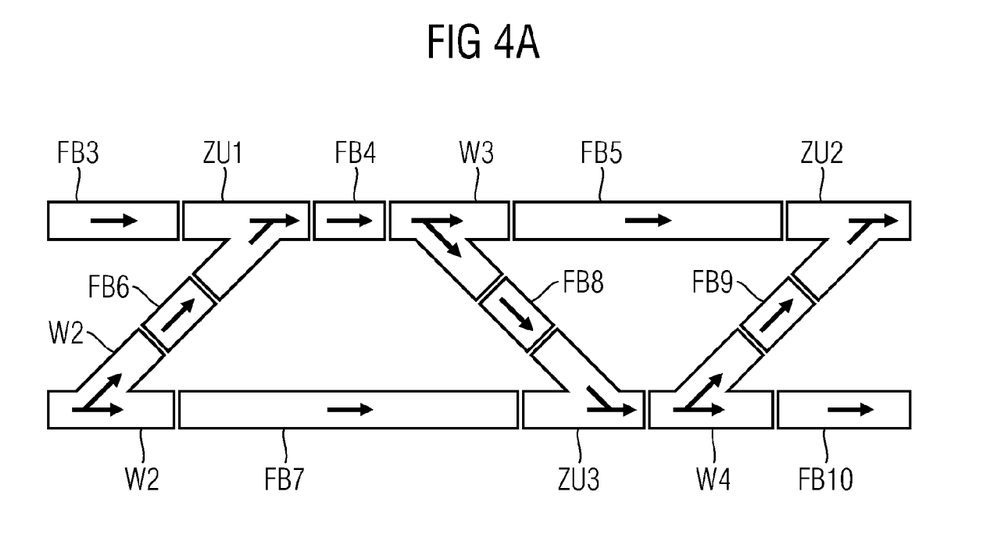
FIGS. 4A-4B is a schematic overview diagram showing the difference between the mechatronic structure of an installation and the configuration thereof in modules or components according to various embodiments.
Figure 4B:
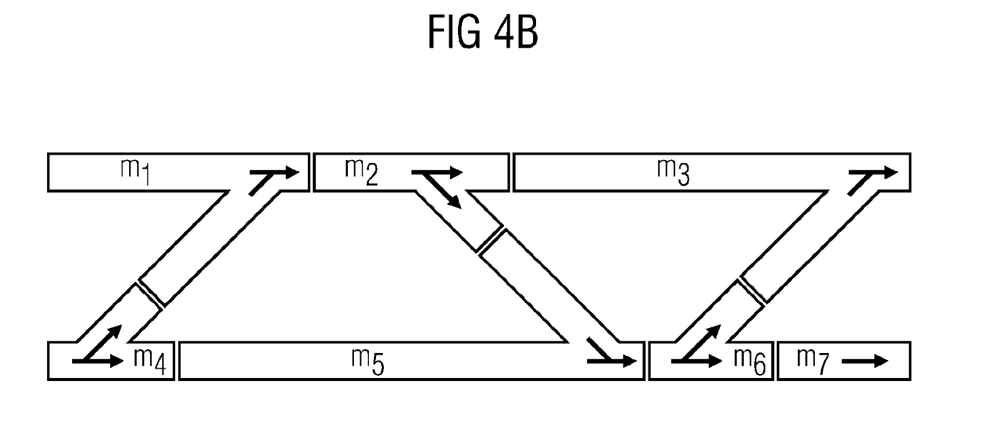

FIG. 4 shows, in a schematic overview, the difference between the mechatronic structure of an installation and the configuration thereof in modules and components according to various embodiments. Partial figure A) in the upper part of FIG. 4 shows the mechatronic structure of an installation with conveying paths FB3-FB10, points W2-W4 and junctions ZU1-ZU3. Partial figure B) in the lower part of FIG. 4 shows a representation of the mechatronic structure in the modules (components) m1 to m7 according to various embodiments.

As an exemplary embodiment, in FIG. 4, the conveying paths FB7 and FB8 and the junction ZU3 is assigned to the module m5. The precise form of modules (components) m1-m7 in decentralized material flow systems is a design decision by the technologist or plant engineer. This design decision depends on the available infrastructure and the demands placed on the installation. A module m1-m7 is an entity which is seen in the decentralized system as a self-contained unit and which possesses information concerning the behavior of said unit. Within each module m1-m7, the complete information is available in order to simulate future loading of said module, since the current loading and the internal behavior are known. Furthermore, additional information on transport units to be transported in future must also be imparted by the advance modules and, similarly, passed on to subsequent modules.

Figure 5A:
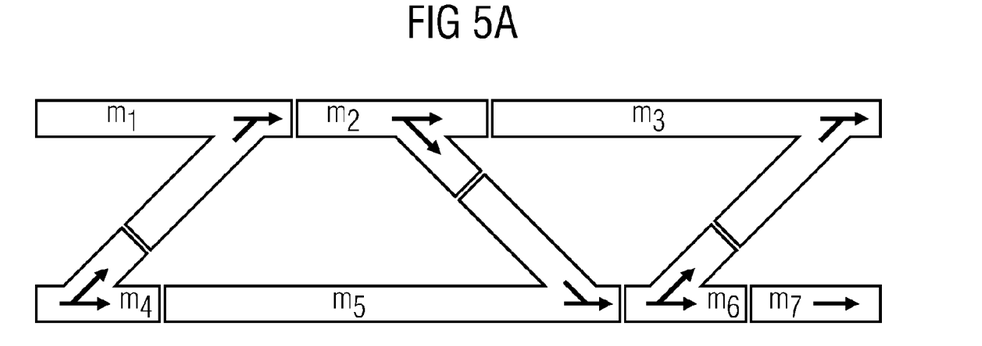
FIGS. 5A-5C is a selected installation scenario showing the exemplary use of the internal simulators according to various embodiments.
Figure 5B:
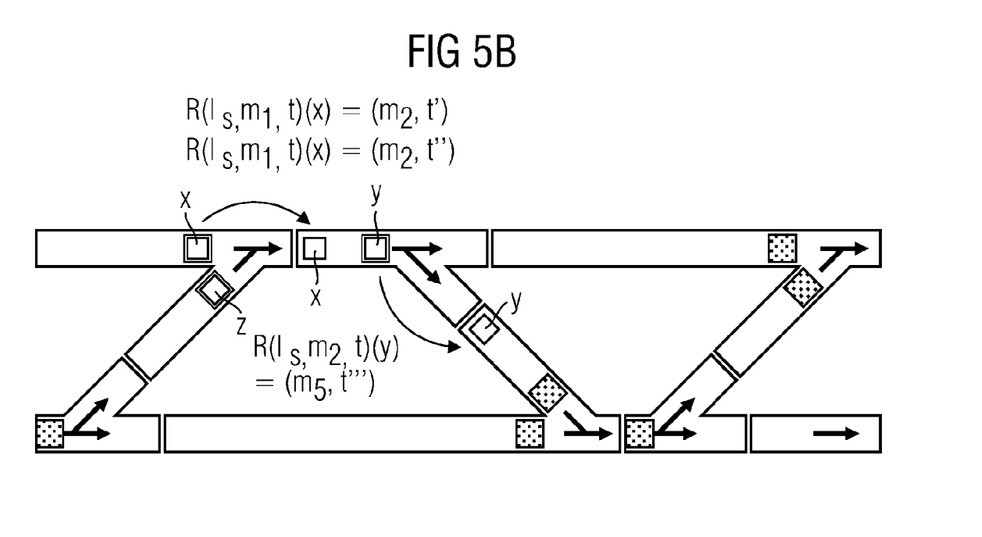
Figure 5C:
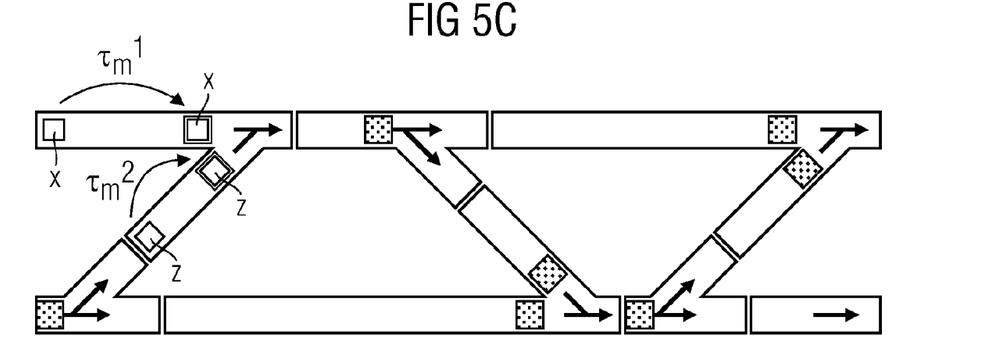

FIG. 5 shows, with a selected installation scenario, the exemplary use of the internal simulators according to various embodiments.

As mentioned in relation to FIG. 2, the information base can be described as the function $$\mathcal{A}(m,t) := \mathcal{A}_e(m,t) \cup \mathcal{A}_s(m,t)$$

which depends on the module m and time t. $T_e(\bullet,\bullet)$ is the portion of the information base for the internal simulation and $T_s(\bullet,\bullet)$ is the portion for the control device.

An exemplary simulation, based on internal simulators of the modules (components) will now be described. Partial figure A) in the upper third of FIG. 5 shows the starting base for the example, specifically the allocation of the mechatronic installation design to modules/components m1-m7, as shown in FIG. 4. For this example, it is assumed that the information base for the control device consists of the portion of transport units on the modules depending on time. I.e. $T_s(m, t)$ contains the portion of transport units in the complete module m at time t. In the case of a set of points, it is only the modules up to the decision site (in FIG. 5 shown shaded grey in the module layout). Furthermore, of interest for the control device are, at the module m, only the values $T_s(m',\bullet)$, for the modules m' which are reachable from m in the material flow.

The control device stipulates for a module the behavior depending on the information base. In general, the control device can also be described with the function $$\mathcal{R}(\mathcal{I}_s, m, t) : x \to (m', t')$$

which assigns to a transport unit x, which is situated at a time t at the decision point of the module m, in the case of information base $\mathcal{I}_s$, the entry into the subsequent module m' at time t'. Partial figure B) in the middle of FIG. 5 illustrates this assignment. The grey shaded areas mark the decision points of the respective module. If two modules are situated simultaneously at the decision points of the module, like the transport units x and z in partial figure B), then the function $\mathcal{R}(\mathcal{I}_s, m, t)(\bullet)$ can pass said units on to the subsequent module corrected. If, in the example of partial figure B), the transport unit passes x on before z in the module $m_1$, then for the entry time points t' and t'' of x and z into the module $m_2$:t'<t'' applies. However, this is a design decision for the implementation of the internal simulation. The function R can assign either x or z to the same time point, $\mathcal{R}(\mathcal{I}_s, m_2, t)(x) = \mathcal{I}_s(\mathcal{R}, m_2, t)(z)$. The internal simulation must then be able to use these values accordingly.

Furthermore, $\mathcal{I}(\bullet,\bullet)$ contains the data $\mathcal{I}_e(\bullet,\bullet)$ necessary for the internal simulation. It is further assumed by the inventors for the example that, in the context of the internal simulation, the arrival time is communicated to each module when a transport unit will reach the module within the simulation. For the sake of simplicity, it is assumed that after reaching a module m, a transport unit reaches the decision point of the module m after a constant time $\tau_m$, i.e. no waiting due to backlogging is taken into account. Then a transport unit x which enters a module m at time t, leaves said module at time t' and enters module where (t', m')= $\mathcal{R}(\mathcal{I}_s, t+\tau_m)(x)$. In the case of modules with a plurality of entry points, the transport time $\tau_m$ can still be dependent on the respective entry (see partial figure C) in the lower third of FIG. 5). Thus the complete transit of the transport unit x through the module m is described. In the example, the information base $T_e(\bullet,\bullet)$ for internal simulation must contain, apart from the values from $T_s(\bullet,\bullet)$, only the transport units which reach a module m at time t.

In the case of the given example, from the information base T(•,•) for a module m, both for the control device and for the internal simulation, only values for modules m' are of interest that can be reached by module m in the material flow. I.e. for the provision of the information base in all modules, it is sufficient if each module communicates to the predecessors thereof the data from the successors thereof and the data from the module concerned. In this process, the occurrence of endless data cycles is to be prevented, using simple standard methods.

The simulation of the modules (components) is cyclically initiated synchronously for all modules simultaneously. Such a cycle can be initiated according to a fixed time pattern, e.g. every 30 s on the minute and every half-minute. By means of a suitable protocol, it must be ensured that all the modules become synchronized at a common time and use the same time plan for the cycle start times. An example of a protocol of this type is the internet protocol ntp.

At the start of the cycle, all the internal simulators are initialized with the transport units at that moment situated in the module at the current location. If a plan exists concerning the transport units to be expected, said units can be taken into account at the relevant modules where said units are to be loaded, with the expected disposal time point thereof. Based on the last information base T(•,•), the time points of the transfer to the successor modules are determined for the transport units situated on the module and then communicated to the relevant modules. For the virtually arriving transport units of each internal simulation, a similar procedure is followed. Transport units the arrival time point of which lies behind the time horizon which is to be simulated are ignored.

Once the internal simulation is complete, the data of the newly determined information base T(•,•) are communicated to the installation and a cycle is concluded. A plurality of cycles can be brought together before the newly arising information base T(•,•) is passed to the control optimizer of the modules.

The simulation can also be activated asynchronously for the modules (components). For this purpose, a module stores the virtually arriving transport units by means of the internal simulators of the adjacent modules. The module notes the expected arrival time and the further properties of the virtually arriving transport units.

In the case of asynchronous activation, the operations of the internal simulators from different modules are not necessarily coordinated. An operation of an internal simulation of a module is therefore independent of the adjacent modules: when the simulation is started in one module, the internal simulator firstly initializes with the transport units then situated in the module at the current location. The internal simulator also initializes with the virtually arriving transport units that are stored by the module. If a plan exists for the module, for transport units to be loaded at this module, then said transport units are also taken into account by the internal simulator with the disposal time point thereof. Based on last information base T(•,•) the time points for transfer to the subsequent modules are determined for all said transport units and are communicated to the relevant modules. The subsequent modules store the values of these virtually arriving transport units for later use in the internal simulations of said modules. The simulation for the module being observed is therefore ended and the information base T(•,•) is updated. After one or more internal simulations, the new information base T(•,•) is transferred to the control device of the module.

The method described is convergent for the following reasons: the time horizon being observed is finite, for example, the maximum permitted throughput time of a transport unit through the installation. Each module m generates at most one message for each received message concerning an item of goods to be transported at time t, said message relates to no earlier than the time point $t+\tau_m$ ($=t_1$+transit time) and passes to a subsequent module and, if needed, a message concerning the actual acceptance time point of the received message at the original module. I.e. following a finite number of messages, the time horizon is reached and no more new messages are sent. Thereafter, a prediction is available in each module concerning the various loading states as far as the time horizon.

In order to ensure the efficiency of the method, it is necessary to match the data to be determined by internal simulation with the data necessary for optimum operation of the installation. The data necessary for optimum operation of the installation are found from the information base used in the control device employed; the data generated by the internal simulation do not need to exceed, in the quality thereof, the quality required by the control device, insofar as this is not necessary for the information base $T_e$ of the internal simulation. The adjustment effort incurred is not dependent on the actual installation and possible loading scenarios. This effort is incurred only during development of the respective general installation type and therefore arises only once.

The disadvantages of modern material flow systems with central material flow computers (MFR1; FIG. 1), specifically a central communication bottleneck, a 'single point of failure' and non-uniform limits for mechatronics, control device and material flow optimization are done away with. The advantages of decentralized, autonomous modules are retained, specifically further-reaching self-configuration, reduced engineering effort, faster commissioning, etc. Nevertheless, a high-quality prediction concerning future load states of the system can be made as the basis for proactive material flow strategies that would otherwise only be qualitatively possible by means of the use of a central material flow computer.

Figure 6A:
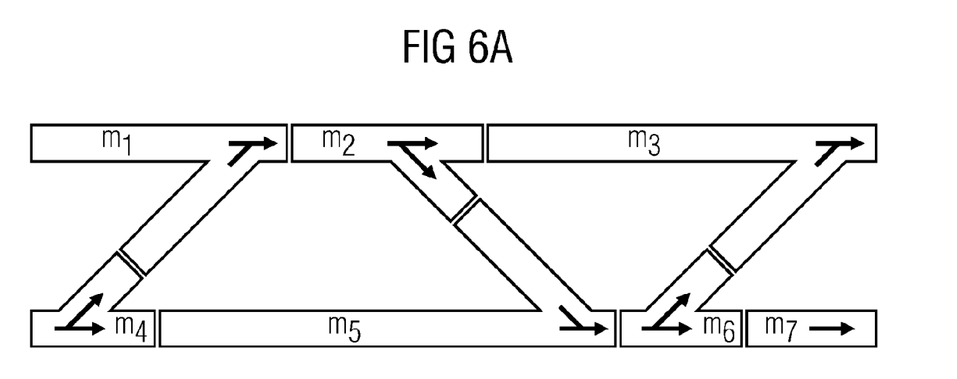
FIGS. 6A-6C is a specialization and development of the example of FIG. 5A-5C.

FIG. 6 shows a specialization and development of the example of FIG. 5. The section of an installation represented schematically in partial figure A) of FIG. 4 is used as the example installation. The installation comprises 8 conveyor belts, 3 sets of points and 3 junctions. The installation is divided into 7 modules, one conveyor belt ($m_7$), three sets of points ($m_2$, $m_4$, $m_6$) and three junctions ($m_1$, $m_3$, $m_5$) (see FIG. 4, partial figure B), FIG. 5, partial figure A) and FIG. 6, partial figure A)). All the transport elements are intended to have the same speed and to be able to receive a transport unit at an entry, every 2 time units.

The information base $T_s(\bullet,\bullet)$ for the control device of the installation comprises the number of transport units on the modules depending on the time, i.e. $T_s(m,t)$ is the number of transport units on the module m at time t. In the case of a set of points, it is only the modules up to the decision point (shaded grey in the module layout). Also of interest for the control device at module m are only the values $T_s(m',\bullet)$, for modules m' that are reachable from m in the material flow.

Figure 6B:
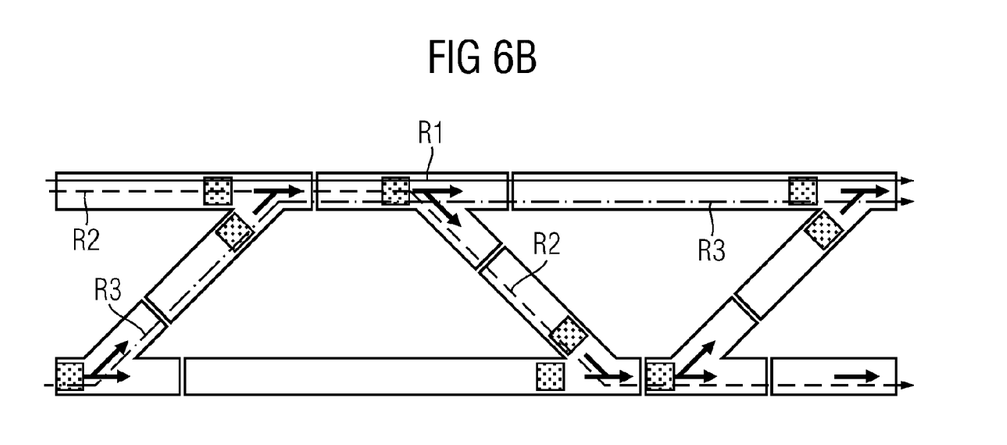

In the example installation, three types of transport units are to be loaded, differentiated in the respective start/destination combination: the types x, y and z. Types x and y reach the installation via module $m_1$ and type z via module $m_4$. Types x and z are intended to leave the installation via module $m_3$ and type y via module $m_7$. In partial figure B) of FIG. 6, the current routes R1-R3 used by the control device are shown for the three types of transport unit:

| R1 (continuous) | R2 (dashed) | R3 (dot-dashed) |
|---|---|---|
| x | y | z |

Figure 6C:
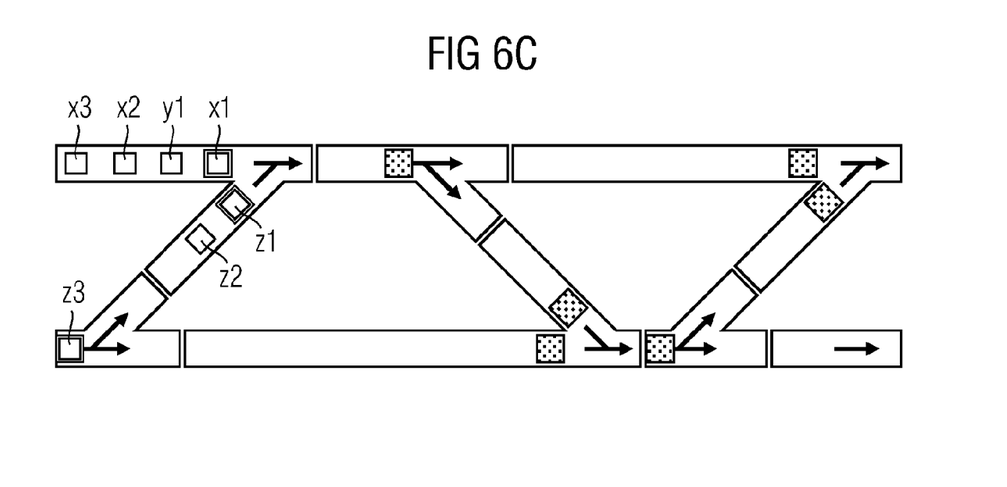

At the time point t=10, the installation is in the situation of partial FIG. 6 C) and the control device still uses the routes of FIG. 6 B). Furthermore, the transport time $\tau_m$ for modules $m_1$ and $m_2$ or $m_4$ is equal to 6 and 0 time units, respectively, and the transport time from the decision point to entry of the subsequent module is 2 time units for all modules. The sequence shown at module $m_1$ of x3 to x1 is the densest possible, i.e. modules $m_1$ and $m_2$ can accept a maximum of 4 transport units up to and including the decision point. The transport speed is such that, after leaving the decision point, the next transport unit arrives not earlier than 2 time units later.

Module $m_2$ then receives the following information concerning the arrival of transport units:

| | Transport unit | | | | | | |
|---|---|---|---|---|---|---|---|
| | $x_1$ | $z_1$ | $y_1$ | $z_2$ | $x_2$ | $x_3$ | $z_3$ |
| Time point | 12 | 13 | 14 | 16 | 18 | 20 | 21 |

Since module $m_2$ receives the virtually arriving transport units, the following information base $T_s(m_2,\bullet)$ is produced. The transport units which reach a transport unit after 6 time units from the entry up to and including the decision point are counted.

| | t | | | | | | | | | | | |
|---|---|---|---|---|---|---|---|---|---|---|---|---|
| | 10 | 11 | 12 | 13 | 14 | 15 | 16 | 17 | 18 | 19 | 20 | 21 |
| $T_s(m_2,t)$ | 0 | 0 | 1 | 2 | 3 | 3 | 4 | 4 | 5 | 4 | 5 | 5 |

If the exemplary installation simulates only 11 time units into the future, then an overload occurs at module $m_2$, since in these 11 time units, module $m_2$ would have to receive 7 transport units. However, the maximum capacity for this time span is only 5 transport units. In the information base, it can be seen that at time points 18, 20 and 21, 5 transport units must be present on the path up to the decision point of module $m_2$. The module offers space for a maximum of 4 transport units.

Once the cycle is concluded, for example, because the time horizon is only 11 time units, then the data obtained are communicated to the information base in the installation. In the particular case of module $m_2$, the data belonging thereto, i.e. the above table with the values of $T_s(m_2,\bullet)$ is communicated to the modules $m_3$ and $m_5$. Furthermore, $m_2$ must pass on the data $T_s(\bullet,\bullet)$ obtained from modules $m_3$ and $m_5$ to $m_1$ and $m_4$. If precisely these data are not needed in the control device, then the communication volume can be reduced. If, for example, only the information as to whether a module is loaded to more or less 50% of capacity is relevant, then it is sufficient to communicate the time spans 10-13 with a maximum of 50% loading and 14-21 with more than 50% capacity utilization.

The control device would now have the possibility of steering the transport units of type z via the route $m_4$-$m_5$-$m_6$-$m_3$ instead of $m_4$-$m_2$-$m_3$ and thus of relieving module $m_2$. Since only transport unit $z_3$ is still situated before the last set of points and could be diverted, in the subsequent internal simulation, the values of $T_s(m_2,t)$ for t=20, 21 would then be reduced from 5 to 4.

The method described is also be usefully employed for installations with a central control device. In this case, the method enables software architecture in which the system limits of software components and the limits of the mechatronics coincide. This means that the real installation can be constructed, in principle, in the software environment of the (central) control device as a mirror-image. Many advantages, such as simpler commissioning with largely self-configuration of the control device based on the given topology and reduced engineering complexity can thus be transferred from decentralized to centrally-controlled installations.

Components of a material flow system for conveying goods, comprising mechatronics with transport elements, sensors and actuators for transporting the goods, a control device for controlling the mechatronics, interfaces with adjacent components and with the surroundings, an internal simulator for determining future states of particular components, wherein the internal simulator cooperates with internal simulators of other components of the material flow system, in order to determine a prediction of the future installation state of the material flow system. The decentralized internal simulators can be activated synchronously or asynchronously.

REFERENCE SIGNS

MR1 Central material flow computer
NS1-NS2 Adjacent control device
SK1-SK3 Control component
SE1-SE5 Sensor
AK1-AK2 Actuator
AZ1-AZ3 Installation state EP1-EP2 Loading plan
SP1-SP2 Control parameter
SO1-SO2 Control optimizer
ES1-ES2 Internal simulator
K1-K5, m1-m7 Component/module
FB1-FB10 Conveyor belt
W1-W4 Points
ZU1-ZU3 Junction
x, x1-x3 Transport unit
y, y1 Transport unit
z, z1-z3 Transport unit
R1-R3 Route

What is claimed is:

1. A material flow system for transporting goods, comprising a plurality of components for carrying out a transportation task, wherein each of the plurality of components comprises:
 a) a mechanical element configured to transport the goods;
 b) a sensory system configured to detect states of at least one of the mechanical element, of the transported goods and of the surroundings;
 c) an actuator system configured to mechanically influence at least one of the mechanical element and the transported goods;
 d) a control system configured to control the mechanical element and the actuator system, based on the data supplied by the sensory system, to current installation state data of the material flow system and to control parameters of the control system;
 e) communication interfaces with adjacent components of the plurality of components and with the surroundings, and
 f) an internal simulator configured to calculate a future state of that component,
 wherein the internal simulators of the plurality of components are decentralized,
 wherein the internal simulator of each component is configured to:
  access data from the respective internal simulators of one or more adjacent components via the communication interfaces, and
  calculate a future state of that component based at least on (a) a current state of that component and (b) the accessed data from the respective internal simulators of the one or more adjacent components, and
 wherein a prediction of a future state of the installation of the material flow system is determined from the respective future states of the plurality of components calculated by the plurality of internal simulators.

2. The material flow system according to claim 1, wherein the internal simulator determines a prediction of the future state of a particular component based on the current installation state data of the material flow system and the control parameters of the control component by simulation.

3. The material flow system according to claim 1, further comprising:
 a control optimizer which, based on the future state data for a particular component as predicted by the internal simulator, optimizes the control parameters accordingly.

4. The material flow system according to claim 1, wherein the internal simulators are activated cyclically and synchronously for all the components.

5. The material flow system according to claim 1, wherein the internal simulators are activated asynchronously.

6. The material flow system according to claim 1, wherein unbalanced loads and jams are recognized in the material flow system, by means of the internal simulators.

7. The material flow system according to claim 3, wherein unbalanced loads and jams in the material flow system are prevented by means of the control optimizer.

8. The material flow system according to claim 1, wherein the internal simulator has access to a loading plan of the material flow system.

9. A component of a material flow system including a plurality of components for carrying out a transportation task for transporting goods, the component comprising:
 a) a mechatronics system with transport elements, sensors and actuators configured to transport the goods;
 b) a control configured to control the mechatronics,
 c) communication interfaces with adjacent ones of the plurality of components and with the surroundings,
 d) an internal simulator configured to calculate a future state of that component,
 wherein the internal simulators of the plurality of components, including the component, are decentralized,
 wherein the internal simulator of the component is configured to:
  access data from the respective internal simulators of one or more adjacent ones of the plurality of components via the communication interfaces, and
  calculate a future state of the component based at least on (a) a current state of the component and (b) the accessed data from the respective internal simulators of the one or more adjacent components, and
 wherein the internal simulator cooperates with the internal simulators of the other components of the plurality of components of the material flow system to determine a future installation state of the material flow system.

10. The component according to claim 9, further comprising:
 a control optimizer which, based on the future state data for the particular component as predicted by the internal simulator, adapts the control parameters of the control device accordingly.

11. The component according to claim 9, wherein the control optimizer prevents unbalanced loads or jams in the material flow system.

12. The component according to claim 9, wherein the internal simulator has access to installation state data of the material flow system.

13. The component according to claim 9, wherein the component makes the presence thereof known to the adjacent components via the interfaces and automatically configures the internal simulator and the control optimizer according to the number and type of adjacent components.

14. A component of a material flow system including a plurality of components for carrying out a transportation task for transporting goods, the component comprising
 a) a mechanical element configured to transport the goods;
 b) a sensory system configured to detect states of at least one of the mechanical element, of the transported goods, and of the surroundings;
 c) an actuator system configured to mechanically influence at least one of the mechanical element and the transported goods;
 d) a control system configured to control the mechanical element and the actuator system, based on the data supplied by the sensory system, to current installation state data of the material flow system and to control parameters of the control system;
 e) communication interfaces with adjacent components of the plurality of components and with the surroundings, and f) an internal simulator configured to calculate a future state of that component, wherein the internal simulators of the plurality of components, including the component, are decentralized, wherein the internal simulator of the component is configured to:
- access data from the respective internal simulators of one or more adjacent ones of the plurality of components via the communication interfaces, and
- calculate a future state of the component based at least on (a) a current state of the component and (b) the accessed data from the respective internal simulators of the one or more adjacent components, and wherein a prediction of a future state of the installation of the material flow system is determined from the respective future states of the plurality of components calculated by the plurality of internal simulators.

15. The component according to claim 14, wherein the internal simulator determines a prediction of the future state of a particular component based on the current installation state data of the material flow system and the control parameters of the control component by simulation.

16. The component according to claim 14, further comprising:
a control optimizer which, based on the future state data for a particular component as predicted by the internal simulator, optimizes the control parameters accordingly.

17. The component according to claim 14, wherein the internal simulators are activated cyclically and synchronously for all the components.

18. The component according to claim 14, wherein the internal simulators are activated asynchronously.

* * * * *